United States Patent [19]

Hytönen

[11] Patent Number: 4,739,554
[45] Date of Patent: Apr. 26, 1988

[54] TOOL FOR CUTTING OF PLASTIC TUBES

[76] Inventor: Pekka Hytönen, Lukinkatu 45, SF-33730 Tampere, Finland

[21] Appl. No.: 924,947

[22] Filed: Oct. 30, 1986

[30] Foreign Application Priority Data

Oct. 31, 1985 [FI] Finland ................................ 854270

[51] Int. Cl.⁴ .............................................. B23D 21/06
[52] U.S. Cl. ........................................ 30/101; 30/94; 30/95
[58] Field of Search ................... 30/101, 100, 102, 94, 30/95

[56] References Cited

U.S. PATENT DOCUMENTS 1,178,347  4/1916  Ratigan ............................. 30/102 X
2,410,901  11/1946 Ramsey ................................ 30/102
3,636,629  1/1972  Baun ...................................... 30/94

Primary Examiner—E. R. Kazenske
Assistant Examiner—Willmon Fridie, Jr.
Attorney, Agent, or Firm—Pollock, VandeSande & Priddy

[57] ABSTRACT

Tool for cutting of plastic tubes comprises an arm portion (1) and at the end of the arm portion a first jaw (2) and a second jaw (3) forming an opening (4) therebetween for insertion of a plastic tube (10) into the opening. The tube is arranged to be cut by a rotational movement (A) of the tool and the tube relative to each other and for accomplishing this, the first jaw (2) is provided with a circular cutting blade (6) and the second jaw (3) is provided with several support areas (9a, 9b, 9c, 9d) for accomodating of tubes of diferent sizes, the areas having each an arcuate surface. The support areas are arranged, as seen in the insertion direction (B), one after the other so that of two successive areas (9a, 9b), the area (9a) further back is adapted to hold a tube of smaller size than the area (9b) in front of it.

7 Claims, 2 Drawing Sheets

4,739,554

TOOL FOR CUTTING OF PLASTIC TUBES

BACKGROUND OF THE INVENTION

The present invention relates to a tool for cutting of plastic tubes which includes an arm portion and at the end of the arm portion a first jaw and a second jaw, which form an opening therebetween for insertion of a plastic tube into the opening. The tool comprises further a cutting blade in the first jaw and a support area in the second jaw for holding the tube against the cutting blade during the cutting operation of the tube by a rotational movement of the tool and the tube relative to each other.

Cutting tools of this type are known for instance from U.S. Pat. Nos. 3,932,937 and 4,157,615. In the constructions shown by these publications the distance between the jaws is adjustable for cutting of tubes of various sizes. These tools have the general drawback, that the clamping of the tube into the tool is a time consuming operation. Moreover, these tools have a rather complicated structure as compared with the simple operation, that is carried out by means of these tools.

The cutting of the tube can be carried out also manually. For example in the electric installation operations PVC-tubes are cut off by means of a knife or a saw. These tools are, however, unhandy to use for cutting of plastic tubes. When a knife is used, the user tries to make an incision around the tube, whereafter it can be snapped off in two parts by bending. However, it is difficult to make a straight section perpendicular to the longitudinal axis of the tube, which would be desirable for the installation of tubes. On the other hand, when a saw is used, the section surface remains uneven and rough.

SUMMARY OF THE INVENTION

Construction of the tool according to the present invention allows to eliminate the aforementioned drawbacks. For achieving this purpose, the tool for cutting of plastic tubes in accordance with the present invention is provided with the jaws which are immobile relative to each other. The support portion is situated so, that the tube can be inserted into the cutting position between the support area and the cutter blade in a direction parallel to the plane of the rotational movement substantially in the direction of the cutting edge of the cutting blade. Due to this structure the plastic tube can easily and quickly be inserted into the cutting position. In a preferred embodiment, the second jaw is provided with several support areas for tubes of different sizes. Due to these support areas the tool can be used for tubes of different sizes without a need for adjusting the distance between the jaws in each case. Other advantageous features of the tool according to the invention is the stopper in the support area of the tube securing the tube in the tool before the cutting movement. The shape of the support area for the tube can be designed to have an arcuate cross-section in the plane of the rotational movement, in which case the support area, when properly dimensioned, support the arcuate surface of the tube on a large contact area. The support areas can also be V-shaped, in which case they support the tube at least at two points.

In the following the invention is described in more detail with reference to accompanying drawings, wherein

Figure 1:
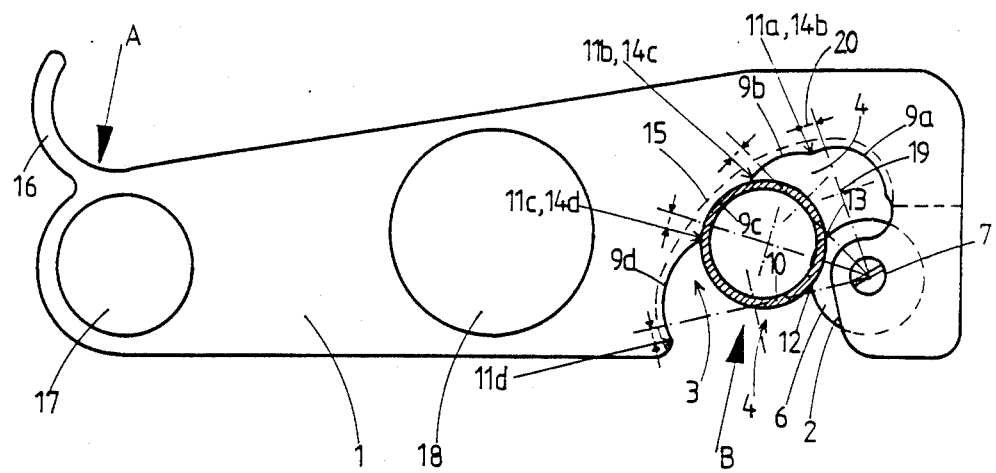
FIG. 1 is a side elevational view of the tool for cutting of plastic tubes according to the present invention.

The cutting tool comprises an arm and at the end of the arm a first jaw 2 and a second jaw 3 defining an opening 4 therebetween, into which the plastic tube can be inserted for a cutting operation, which is carried out with a rotational movement. The first jaw (2) has a longitudinal recess 5, wherein there is mounted a disc-like circular cutting blade 6. The blade 6 is fixed at its centerpoint by means of a screw 7 or any other suitable fixing means on the bracket 8 formed on both sides of the blade by the recess 5 of the first jaw 2. The fixation is arranged to be loosened for rotating out a new area of the cutting blade 6 after the old cutting area has become dull. The fixing means can be also completely detached for replacing the cutting blade with a new one.

For fitting the tubes into the tool the second jaw 3 is provided with support areas 9 having each an arcuate surface, which lies opposite to the cutting blade 6. The support areas are situated one after the other seen in the insertion direction (arrow B) of the tube and border on each other. The support areas are designed to hold the tube against the cutting blade 6 during the cutting movement. The support areas are dimensioned for tubes of different diameters and for achieving this purpose they are arranged one after the other so, that their radiis of curvature decrease along the insertion direction B of the tube, i.e. from the mouth of the opening towards the area, where the jaws 2 and 3 join. With this arrangement, a tube can always be inserted into the tool so, that it passes between the cutting blade and the support areas for tubes of larger diameter, until it reaches the position, where it stays between the cutting blade and the support area suitable for the diameter of the inserted tube.

Figure 2:
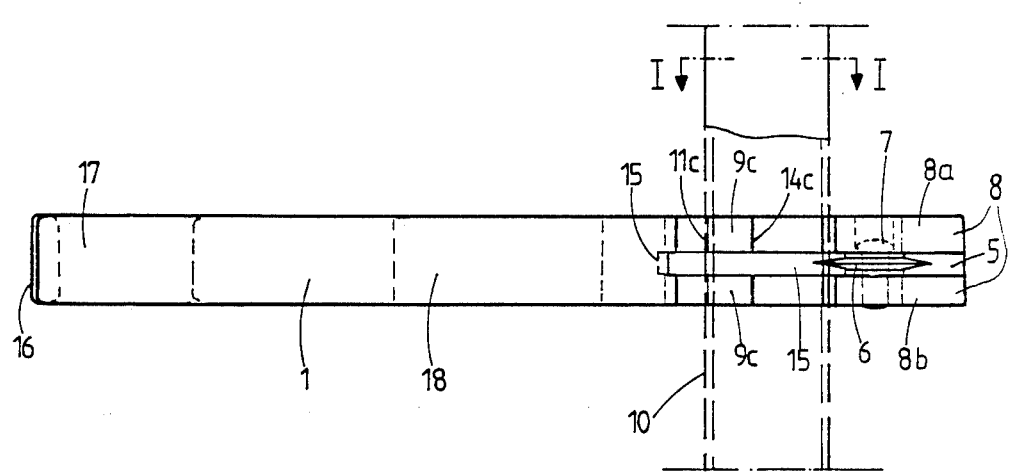
FIG. 2 is a view of the same rotated 90° about its longitudinal axis and seen in the insertion direction of the tube.

Before the cutting operation the user has the cutting tool in one hand and the plastic tube to be cut is held by the other hand. The plastic tube, indicated by the reference numeral 10, is inserted into the cutting position in the opening 4 of the tool, where it extends transversally to the arm 1 of the tool, as shown in FIGS. 1 and 2. The insertion is carried out by introducing the tube into the opening in the direction of the cutting edge of the cutting blade 6 (arrow B), until it touches both the edge of the cutting blade 6 and the threshold 11c, which bounds the support area 9c suitable for the size of the tube towards the direction opposite to the insertion direction B. From this position the tube is rotated clockwise as seen in FIG. 1 and the tube due to its elasticity moves over the threshold point 11c and clicks onto its place between the cutting blade 6 and the support area 9c. At the same time, the cutting edge of the cutting blade 6 penetrates into the surface of the tube.

For preventing the further rotational movement of the tube towards the insertion direction B away from its support area 9c, the tube must be prevented from rotating about that point 13 of intersection between the periphery of the tube 10 and the cutting edge of the cutting blade 6, which is the most remote as seen in the insertion direction B. In order to accomplish this, the distance of support point 14c of the support area 9c, which is located remotest as seen in the insertion direction B, from the intersection point 13 must be substantially smaller than the greatest possible distance of the periphery of the tube on the support area 9c from the intersection point 13, which is illustrated also in the embodiment of FIG. 1. On the other hand, for securing the tube against the movement towards the opposite direction, the distance of the nearest support point 11c of the support area 9c, seen in the insertion direction B, from the nearest intersection point 12 of the cutting edge of the cutting blade 6 and the periphery of the tube 10 must be smaller than the greatest possible distance of the periphery of the tube on the support area 9c from the intersection point 12. In the embodiment shown by FIG. 1, the rotational movement of the tube back into the direction opposite the insertion direction B is prevented by support point 11c, which acts as a stopper against such movement.

The support points 11c and 14c are at the same time points, where the support area 9c borders on adjacent support areas. Thus, in a similar manner the point 11c shown in the example acts at the same time as a stopper 14d for a preceding support area 9d for a larger tube, seen in the insertion direction B, preventing the tube fitting onto this support area 9d from moving further into the insertion direction B. Consequently the point 14c acts as a stopper 11b for the next support area 9b in the insertion direction B of a smaller tube, preventing the tube fitting onto this area from moving back into the direction tube fitting onto this area from moving back into the direction opposite to the insertion direction B. The support points in the areas 9a, 9b, 9d common with the adjacent area act in a corresponding manner.

From the locked position of the tube shown in FIG. 1, the cutting movement is initiated by holding the tube in the hand and by rotating the cutting tool around the tube with the other hand counterclockwise with respect to the tube as seen in FIG. 1 (arrow A). Consequently, the plastic tube 10 moves clockwise with respect to the cutting tool. The arm 1 moves during this operation around the central axis of the tube in a plane perpendicular to the said axis, which in this application is called the plane of the rotational movement. The cutting edge of the cutting blade 6 also parallel to the plane of the rotational movement moves along the periphery of the tube making an incision through the surface of the tube. During the cutting movement the support area 9c supports the tube securing it at its place in the opening 4 preventing its rotation around the point of intersection 13 in a manner described hereinabove. When the tube 10 is held in this manner against the support area 9c and when at the same time the cutting blade 6 is immobile, a stable position of the tube and an effective cutting action of the blade is possible. In this case the surface of the tube does not give way to the blade at the area of penetration of the blade, which often is the case when freely rotating disc-like blades are used.

The depth of the incision of the cutting blade 6 is preferably the same or a little greater than the thickness of the tube wall. The tube is not, however, cut off after the first revolution of the tool around the tube, because depending on the material of the tube it will be slightly compressed more or less between the blade and the support area and a gradually deepening groove forms in the tube wall during further revolutions around the tube. The complete severing of the tube into parts requires several revolutions around the tube. When PVC-tubes are cut, it is necessary only to obtain a sufficiently deep groove on the surface of the tube. In this case, only one revolution around the tube is needed, whereafter the tube is rotated back away from the tool and bent and the tube snaps off in two parts along the aforementioned peripheral groove. The time needed for the cutting of the tube is considerably shortened by this method. It must be also noted, that by using the tool according to the present invention, no internal burr is formed inside the tube, which must be removed before the installation, which would be the case, if a saw were used.

On manufacturing the cutting tool, the support areas in the second jaw 3 can be dimensioned in accordance with the method shown by FIG. 1. At first, the location of the centerpoint of the smallest tube farthest back in the opening is determined with respect to the cutting blade 6 and the support area 9a is formed along the periphery of the tube. For ensuring the locking of the tube in the tool, the support area 9a is continued by a distance 20 towards the mouth of the opening 4 over the line drawn through the centerpoints of the blade 6 and the tube. The end point 11a of this support area 9a defines consequently the location of the tube of the next larger diameter and the support area 9b of this next tube is formed in a similar manner. In this way the jaw 3 can be provided with a required amount of support areas for tubes of different sizes.

The support areas 9 can be provided with a groove or a recess aligned with the plane parallel to the cutting edge of the blade and parallel to the plane of the rotational movement. This recess is indicated in Figures by the reference numeral 15. By means of this recess a space for the edges of the cut incision is obtained. These objects protrude slightly out of the surface of the tube and they are formed by effect of the cutting edge having a conical cross-section. This recess improves the stability and guiding of the tube on its support area.

FIG. 2 shows an example of the mounting of the cutting blade 6 into the first jaw 2. The other lug 8a of the bracket 8 has a hole passing therethrough and having a diameter of the head of the screw 7, and the opposite lug 8b of the bracket 8 has a concentric hole passing therethrough and threaded to fit the threaded part of the screw. In the middle of the disc-like cutting blade 6 there is a hole concentric with the centerpoint of the blade. Through this hole the screw can be mounted on its place to extend between the lugs, an the outer edge of this hole is shaped to correspond to the shape of the head of the screw so that when the screw is mounted on its place by inserting it through the hole in the other lug, its head presses the blade 6 against the opposite lug 8b of the bracket 8 locking the blade in an immobile position. The locking can be easily loosened and it can be completely released by means of this screw.

The arm of the cutting tool can be designed to fit well in the hand during the cutting operation. In the preferred embodiment shown by the Figures, a hook 16 and a ring 17 for fingers are formed at the free end of the arm. By means of them the tool can be easily rotated by taking hold of the hole at the free end of the arm and the greatest possible leverage can thus be taken advantage of in the cutting operation. Figures show further a hole 18 arranged in the arm for various auxiliary means such as for conical file for shaping the head of the plastic tube.

Figure 3:
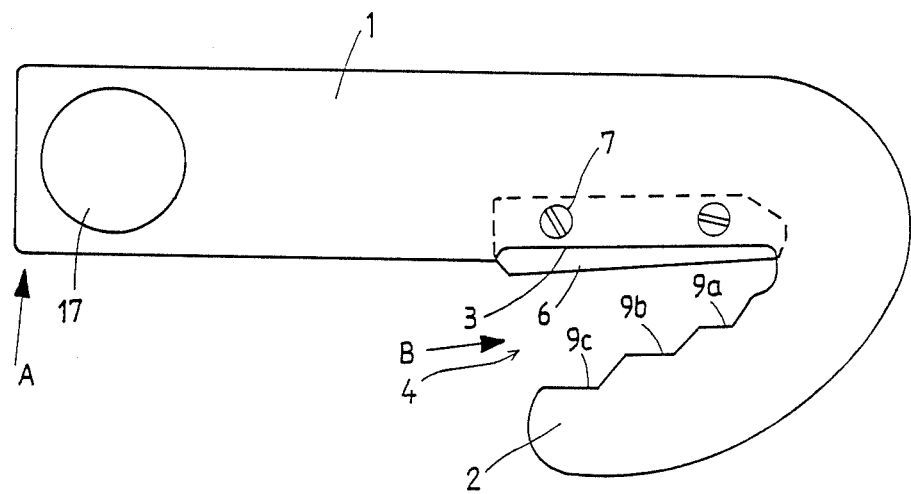
FIG. 3 is a side elevational view of an alternative embodiment of the tool according to the present invention.

The cutting tool can be manufactured of metal, for example of suitable aluminium alloy by means of common machining methods or light metal casting. The tool can be manufactured also of a suitable plastic material by injection moulding. A core element acting as a supporting structure can be made of a steel plate and to the both sides thereof peaces giving the final shape of the tool can be joined by molding of suitable plastic material, for example glass fibre reinforced polyamide. The core element can be placed at least in the area around the jaws and by this method the aforementioned recess of the support areas and the recess for the blade in the bracket of the first jaw are obtained in a simple manner, where the edges of the platelike core element form the bottom of these recesses. The invention is not restricted only to the embodiment referred to in the description. It is clear, that the invention can be modified within the scope of the claims. The location of the jaws and the opening relative to the arm are not necessarily similar to the shapes shown by the above embodiment. As shown in FIG. 3, the tool can be for example J-shaped, in which case the first jaw with the cutting blade therein forms an integral part of the arm and for achieving the aforementioned shape, the end of the arm is bent towards the first jaw and this bent portion forms the second jaw with its support areas. Also other modifications, where the jaws join the arm forming an opening between are possible.

The support areas of the second jaw are preferably arcuate, because they in this configuration support the surface of the tube along their whole area, but support surfaces of other shape, which allow the tube to be rotated in the cutting tool, are possible as well. The support areas (aa, ab, ac) can be for example V-shaped as shown in FIG. 3 and they support the tube in this case at two points. As also shown in FIG. 3, the cutting blade 5 may be provided with a straight edge. A suitable amount of support areas can be arranged in the cutting tool depending on the amount of various tube sizes. The relative location between the blade 6 and the support areas 9 can always be designed so that when a tube is rotated into the opening 4, it will in each case be locked between the cutting blade 6 and a support area 9 suitable for its size. When the tool is designed for works, where the diameters of the plastic tubes follow a certain standard, such as plastic tubes used in electric installation operations, the support areas 9 and their distances from the cutting blade 6 can be dimensioned according to these standard sizes. In addition to plastic tubes of electric installation operations, the tool can be designed also for any tubes of plastic material, such as drainage pipes, sewer pipes and pipes used in water supply lines.

I claim:

1. A tool for cutting plastic tubes comprising:
an arm portion;
a first and second jaw located at one end of said arm portion, said jaws being immobile relative to each other, said jaws forming an opening therebetween for insertion of a plastic tube;
a single cutting blade provided in said first jaw;
a support portion in said second jaw for holding said tube against said cutting blade during the cutting operation by rotational movement of said tool and tube relative to each other, said support portion including a plurality of support areas situated adjacent to each other along said second jaw, said support areas having different dimensions decreasing in the direction of the insertion of the tube for accommodation of tubes of different sizes,
wherein said single cutting blade is arranged to cut the tube inserted into any of said support areas, the cutting edge of cutting blade facing said support areas is arranged to penetrate said tube at two spaced apart points of intersection, each of said support areas include two support points acting as stoppers, and,
wherein said two insertion points of said cutting edge and said two support points of said support area create a locking effect for preventing the tube from rotating away from said support area in both directions along said second jaw.

2. A tool according to claim 1 wherein said support areas are constituted by surfaces having each an arcuate cross-section in the plane of the rotational movement.

3. A tool according to claim 1 wherein said support areas are constituted by surfaces formed by two intersecting planes and have V-shaped cross-section in a plane of rotational movement.

4. A tool according to claim 2 wherein said support areas at the joining points of the two adjacent surfaces form said support points acting as stoppers for preventing the tube from rotating away from the cutting position.

5. A tool according to claim 2 wherein said arcuate support surfaces include a groove for engaging the protruding edges of the incision on the plastic tube, the longitudinal direction of said groove being in a plane of rotational movement coinciding with the cutting edge of the cutting blade.

6. A tool according to claim 1, 2, 3, 4 or 5 wherein said cutting blade has a substantially straight edge.

7. A tool according to claim 1, 2, 3, 4 or 5 wherein said cutting blade has a circular shape and is removably affixed to said first jaw, said blade adapted to be loosened or released for allowing the rotation of a new area in the cutting blade into the cutting position and replacement of the cutting blade.

* * * * *